United States Patent
Perlman

(10) Patent No.: US 7,573,529 B1
(45) Date of Patent: Aug. 11, 2009

(54) SYSTEM AND METHOD FOR PERFORMING INTERLACED-TO-PROGRESSIVE CONVERSION USING INTERFRAME MOTION DATA

(75) Inventor: Stephen G. Perlman, Palo Alto, CA (US)

(73) Assignee: Digeo, Inc., Kirkland, WA (US)

( * ) Notice: Subject to any disclaimer, the term of this patent is extended or adjusted under 35 U.S.C. 154(b) by 0 days.

(21) Appl. No.: 09/379,710

(22) Filed: Aug. 24, 1999

(51) Int. Cl.
H04N 7/01 (2006.01)

(52) U.S. Cl. ..................... 348/448; 348/452

(58) Field of Classification Search ............ 348/448, 348/441, 443, 451, 452, 459; H04N 7/01
See application file for complete search history.

(56) References Cited

U.S. PATENT DOCUMENTS

| | | |
|---|---|---|
| 5,144,429 A | 9/1992 | Haghiri et al. |
| 5,305,104 A | 4/1994 | Jensen et al. |
| 5,400,077 A | 3/1995 | Cookson et al. |
| 5,465,119 A | 11/1995 | Demos |
| 5,467,132 A | 11/1995 | Fazel et al. |
| 5,488,421 A | 1/1996 | Hwang et al. |
| 5,508,746 A | 4/1996 | Lim |
| 5,646,693 A | 7/1997 | Cismas |
| 5,689,305 A | 11/1997 | Ng et al. |
| 5,745,909 A | 4/1998 | Perlman et al. |
| 5,790,113 A | 8/1998 | Perlman et al. |
| 5,793,435 A | 8/1998 | Ward et al. |
| 5,841,819 A | 11/1998 | Hu et al. |
| 5,874,937 A | 2/1999 | Kesatoshi |
| 6,073,168 A | 6/2000 | Mighdoll et al. |
| 6,141,693 A | 10/2000 | Perlman et al. |
| 6,173,296 B1 | 1/2001 | Perlman et al. |
| 6,195,086 B1 | 2/2001 | Perlman et al. |
| 6,198,773 B1 | 3/2001 | Gill et al. |
| 6,269,484 B1 * | 7/2001 | Simsic et al. ............... 348/448 |

OTHER PUBLICATIONS

PCT Search Report, PCT/US00/19611, mailed Nov. 3, 2000, 3 pages.
PCT Search Report Dated Nov. 16, 2001, 6 pages.

* cited by examiner

*Primary Examiner*—Sherrie Hsia
(74) *Attorney, Agent, or Firm*—Kory D. Christensen; Stoel Rives LLP

(57) ABSTRACT

An apparatus is described comprising: a decode unit which receives an encoded interlaced video signal including encoded interframe motion compensation data, and responsively transmits a decoded interlaced video signal and associated interframe motion compensation data; and a de-interlace unit which converts the interlaced video signal to a progressive video signal, and which, responsive to the interframe motion compensation data, selects a region of the interlaced video signal for a different type of conversion, the selection based on the change in position of the region between successive video frames.

51 Claims, 8 Drawing Sheets

SYSTEM AND METHOD FOR PERFORMING INTERLACED-TO-PROGRESSIVE CONVERSION USING INTERFRAME MOTION DATA

BACKGROUND OF THE INVENTION

1. Field of the Invention

This invention relates generally to the field of video conversion systems. More particularly, the invention relates to a system and method in which interframe motion compensation data generated during video image compression is used for performing interlaced-to-progressive video image conversion.

2. Description of the Related Art

Various types of video monitors reproduce images in an "interlaced" format (e.g., television monitors). A portion of an interlaced video monitor 140 is illustrated in FIG. 1. As shown, the image scanned onto the monitor 140 may be separated into a plurality of even rows of pixels 150, 152, 154, etc., separated by an equal number of odd rows of pixels 151, 153, 155, etc. An electron scanning beam or other scanning apparatus (not shown) first scans all of the odd rows of pixels 151, 153, 155, etc., of the image in succession and—after the last odd row has been scanned—scans all of the even rows 150, 152, 154, etc. The scanning rate (i.e., the number of times even/odd row pairs are scanned in a second) for a standard television image is 30 Hz in the United States and 25 Hz in Europe.

An interlaced data stream 130, which the scanning apparatus reads to generate the interlaced video image 140, may be separated into sequential groups of odd 110 and even 120 video data. In FIG. 1, odd video data group 110 and even video data group 120 within the data stream 130 comprise all of the information needed by the scanning apparatus to scan an entire video "frame" (a single image within the series of images that comprise the interlaced video).

The scanning apparatus in a non-interlaced or "progressive" video monitor does not scan odd lines followed by even lines as does the scanning apparatus of an interlaced monitor. Rather, in a progressive monitor, the scanning apparatus simply scans each row in succession (e.g., row 1, row 2, row 3, etc.) to reproduce each video frame.

Sometimes an interlaced video data stream must be converted so that it can be displayed on a progressive video monitor. This is accomplished using a scan converter 240 such as the one illustrated in FIG. 2. For the purpose of illustration, the odd data group 110 and even data group 120 of data stream 130 have been further broken down into individual rows of video data (e.g., odd rows 211, 212 and even rows 221, 222). The scan converter 240 shuffles the data rows as illustrated so that new progressive data stream 230 includes data for reproducing the image by scanning the rows of pixels sequentially (i.e., odd row 211 followed by even row 221, followed by odd row 212 . . . etc).

One problem which occurs when converting an interlaced image to a progressive image is that image distortion or banding may occur. This problem is particularly noticeable when low resolution interlaced image is scaled up and converted to a higher resolution progressive image and/or when the elements which comprise the interlaced image are in motion (i.e., change position from one video frame to another).

For example, as illustrated in FIG. 3 a football 310 which comprises an element within an interlaced image may be moving at a relatively high rate across the interlaced video monitor 350 (in this case, in a horizontal, rightward direction). When the scan converter 240 converts the interlaced data 130 to progressive data 230, the reproduction of the football 310 on the progressive monitor 360 may show leftward image banding 320 and rightward image banding 321 (i.e., banding parallel to the motion of the element). This is because when the interlaced video data was originally generated the odd lines were scanned first (e.g., in the first $\frac{1}{60}$ of a second), and then the even lines were scanned (e.g., in the second $\frac{1}{60}$ of a second). Accordingly, for elements in motion such as football 310, the odd-row portion of the image 320 and the even-row portion of the image 321 may be spatially separated by the distance the football 310 traveled in $\frac{1}{60}$ of a second.

Numerous image correction techniques have been developed to solve the foregoing problem (e.g., "line doubling" or other image data extrapolation mechanisms). All of these prior techniques, however, require a substantial amount of processing power and memory overhead to cure the foregoing image banding problem. For example, in order to extrapolate a corrected image from two separate groups of image data (i.e., the even and odd image rows described above), the two groups of data must be concurrently stored in memory and analyzed in a relatively short period of time (e.g., before the next sequential frame is to be displayed). Accordingly such systems typically require complex, relatively expensive video processors and a great deal of fast access memory to store the successive frames to be analyzed.

In addition, such systems introduce a multi-frame delay in processing the video since multiple successive frames must be stored and analyzed before the first frame in the sequence can be displayed. This delay becomes more of a significant issue in audiovisual configurations which have separate audio and video systems (e.g., home theaters, video conferencing systems . . . etc). In such configurations, the multi-frame video delay may cause the video and audio to become unsynchronized (i.e., by an amount equal to the multi-frame delay). Although resynchronization is possible by adding a delay in the audio equal to the multi-frame delay, it requires audio hardware complex enough to include a delay feature and capable of precise calibration (e.g., calibration may need to be on the order of $\frac{1}{10}^{th}$ of a second or better to precisely synchronize lip motion in the video with speech).

Accordingly, what is needed is a system and method for converting between interlaced and progressive data which does not require the same processing and memory overhead needed in prior image correction systems. What is also needed is a system and method which will use preexisting data generated when the video is encoded, such as the interframe motion compensation data generated under the Motion Picture Experts Group (hereinafter "MPEG") compression algorithms (e.g., MPEG-1, MPEG-2 . . . etc). What is also needed is a system and method which does not introduce a real-time delay when performing interlaced to progressive conversion.

SUMMARY OF THE INVENTION

An apparatus is described comprising: a decode unit which receives an encoded interlaced video signal including encoded interframe motion compensation data, and responsively transmits a decoded interlaced video signal and associated interframe motion compensation data; and a de-interlace unit which converts the interlaced video signal to a progressive video signal, and which, responsive to the interframe motion compensation data, selects a region of the interlaced video signal for a different type of conversion, the selection based on the change in position of the region between successive video frames.

Also described is a method comprising the steps of: receiving an encoded interlaced video signal including encoded interframe motion compensation data, the interlaced video signal comprised of data for generating an interlaced video image, and the encoded interframe motion compensation data identifying a region of the interlaced video image; separating the interframe motion compensation data from the interlaced video signal; de-interlacing the region of the interlaced video image using a first de-interlace technique; and de-interlacing the remaining portions of the interlaced video image using a second de-interlace technique.

Also described is a method for converting an encoded video signal comprising the steps of: determining a source video data type encoded in the encoded video signal; determining whether the source video data type is one for which interframe motion data may be used for conversion; selecting a particular frame rate conversion ratio if the source video data type may be converted without use of the interframe motion compensation data; and using the frame rate conversion ratio to convert each frame of the source video data type to one or more frames of a destination video data type.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

Embodiments of the present invention includes various steps, which will be described below. The steps may be embodied in machine-executable instructions. The instructions can be used to cause a general-purpose or special-purpose processor which is programmed with the instructions to perform certain steps. Alternatively, these steps may be performed by specific hardware components (e.g., silicon chips) that contain hardwired logic for performing the steps, or by any combination of programmed computer components and custom hardware components.

Elements of the present invention may be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, or other type of media suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

One Embodiment of a System and Method for Performing Interlaced-to-Progressive Conversion Using Interframe Motion Data The video data 410 in one embodiment of the system is encoded using a "Motion Picture Experts Group" video compression algorithm such as MPEG-1 or MPEG-2. The MPEG-2 format is currently used for encoding video on Digital Video Disks (hereinafter "DVDs"), and for encoding video transmissions by digital cable and satellite broadcast companies.

Compression algorithms such as MPEG-1 and MPEG-2 significantly reduce the bandwidth and storage capacity requirements for a video signal. For example, MPEG-2 is capable of compressing a standard 124 M-bit/second video bit rate down to about 3-15 M-bit/second. This level of compression is accomplished by removing redundant information from the video signal at the encoder prior to transmission, and re-inserting it at the decoder.

Figure 5:
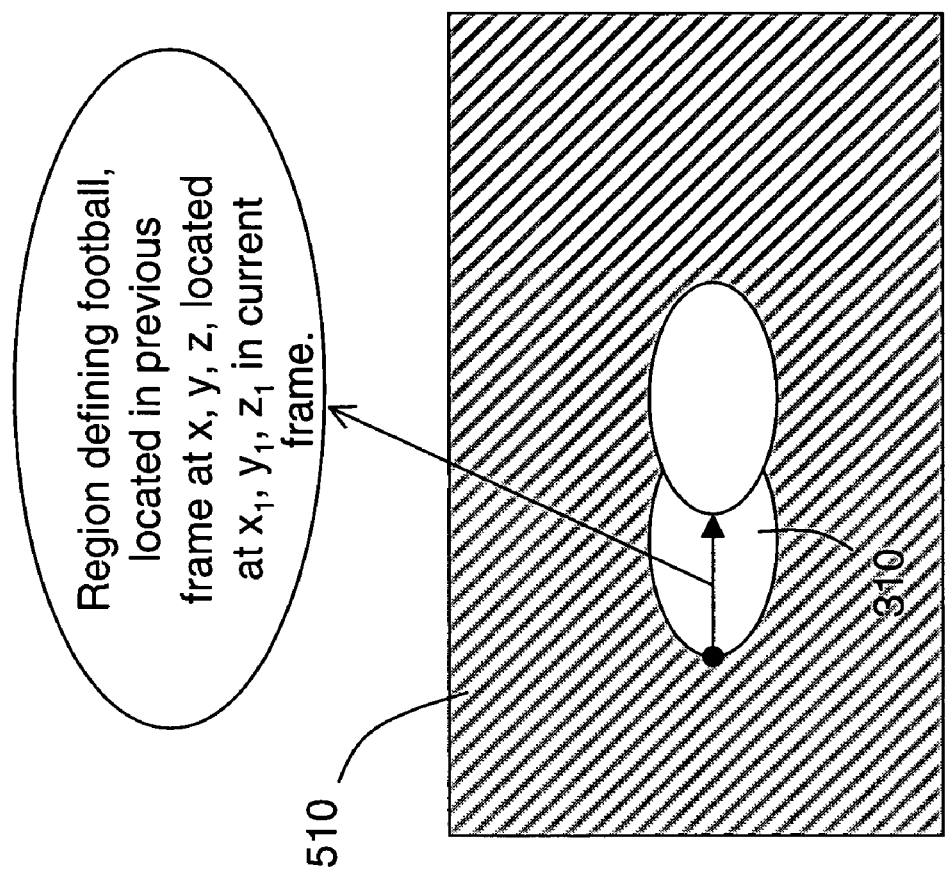
FIG. 5 illustrates the general type of interframe data encoded into a video data stream in one embodiment of the invention.

One compression technique employed by the MPEG codec is known as motion-compensated inter-frame prediction. This technique exploits temporal redundancy by attempting to predict the frame to be coded from a previous frame (i.e., the previous frame is used as a "reference" frame for the current frame). More specifically, this technique stores vector data which describes the motion of one or more regions of the video image. For example, as illustrated in FIG. 5, the motion compensation data encoded in the MPEG data stream describes the horizontal motion of football 310.

Figure 1:
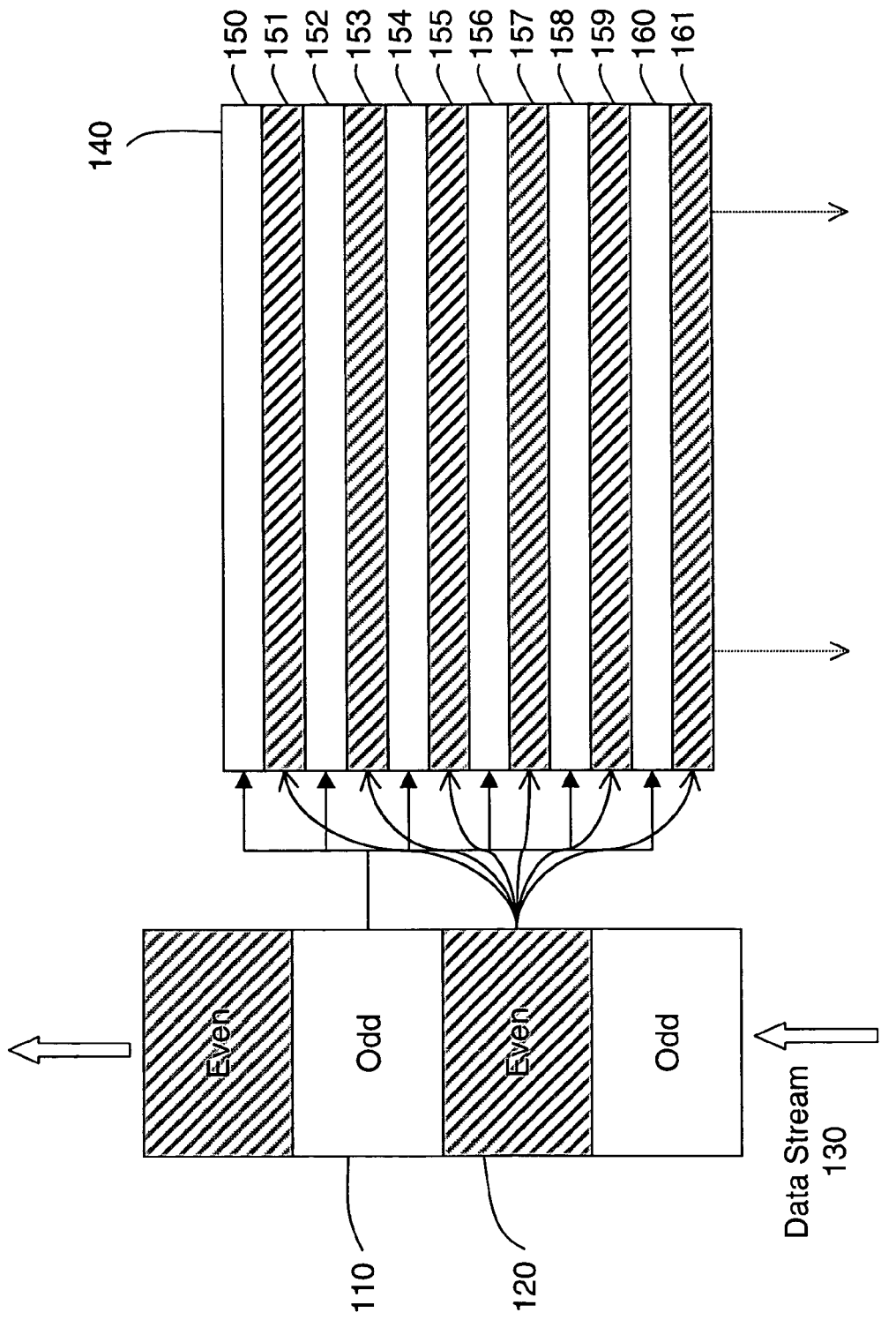
FIG. 1 illustrates an interlaced video data stream and the corresponding even and odd rows of a video monitor.
Figure 2:
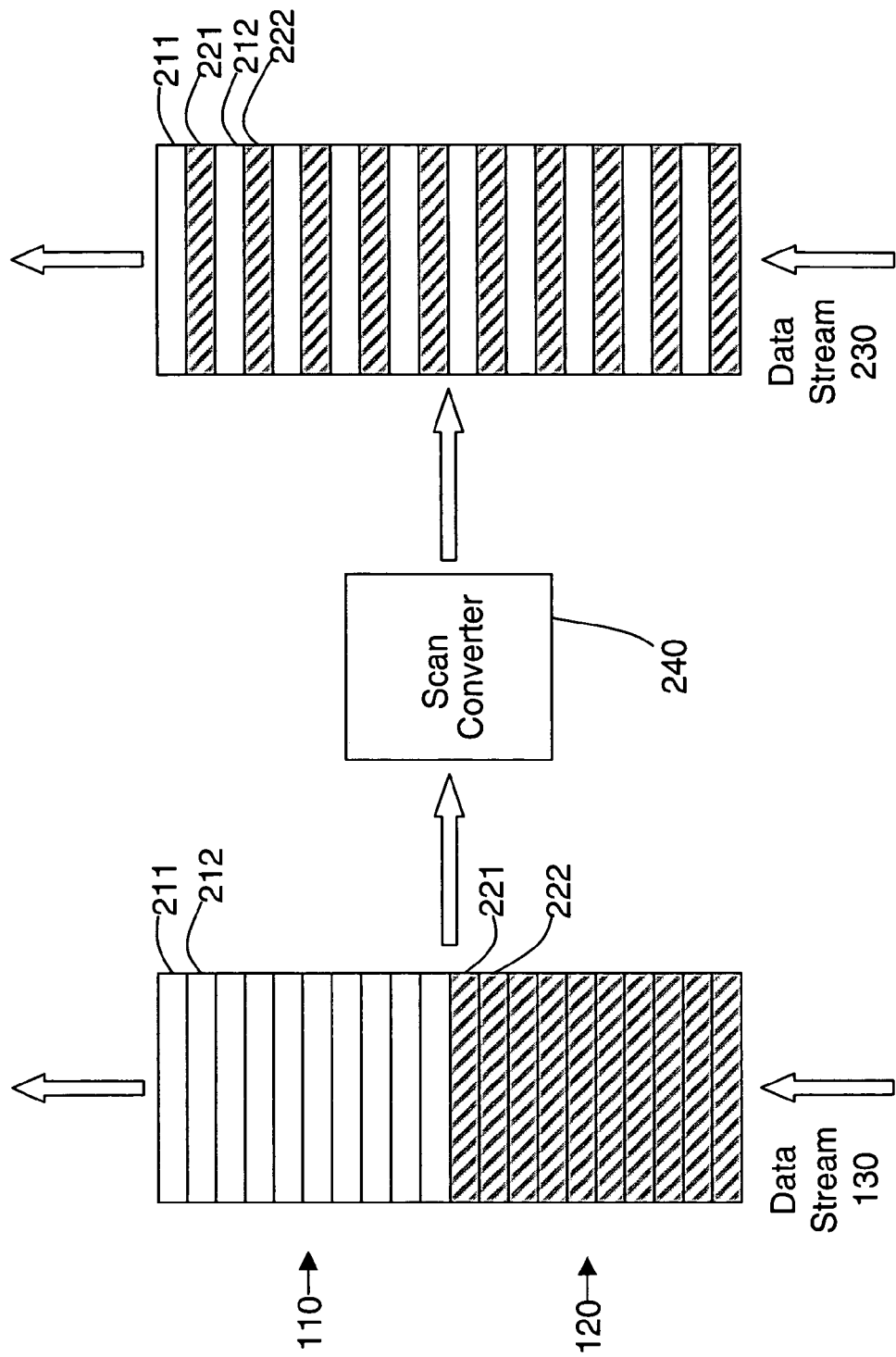
FIG. 2 illustrates a scan converter for converting between interlaced and progressive video data.
Figure 3:
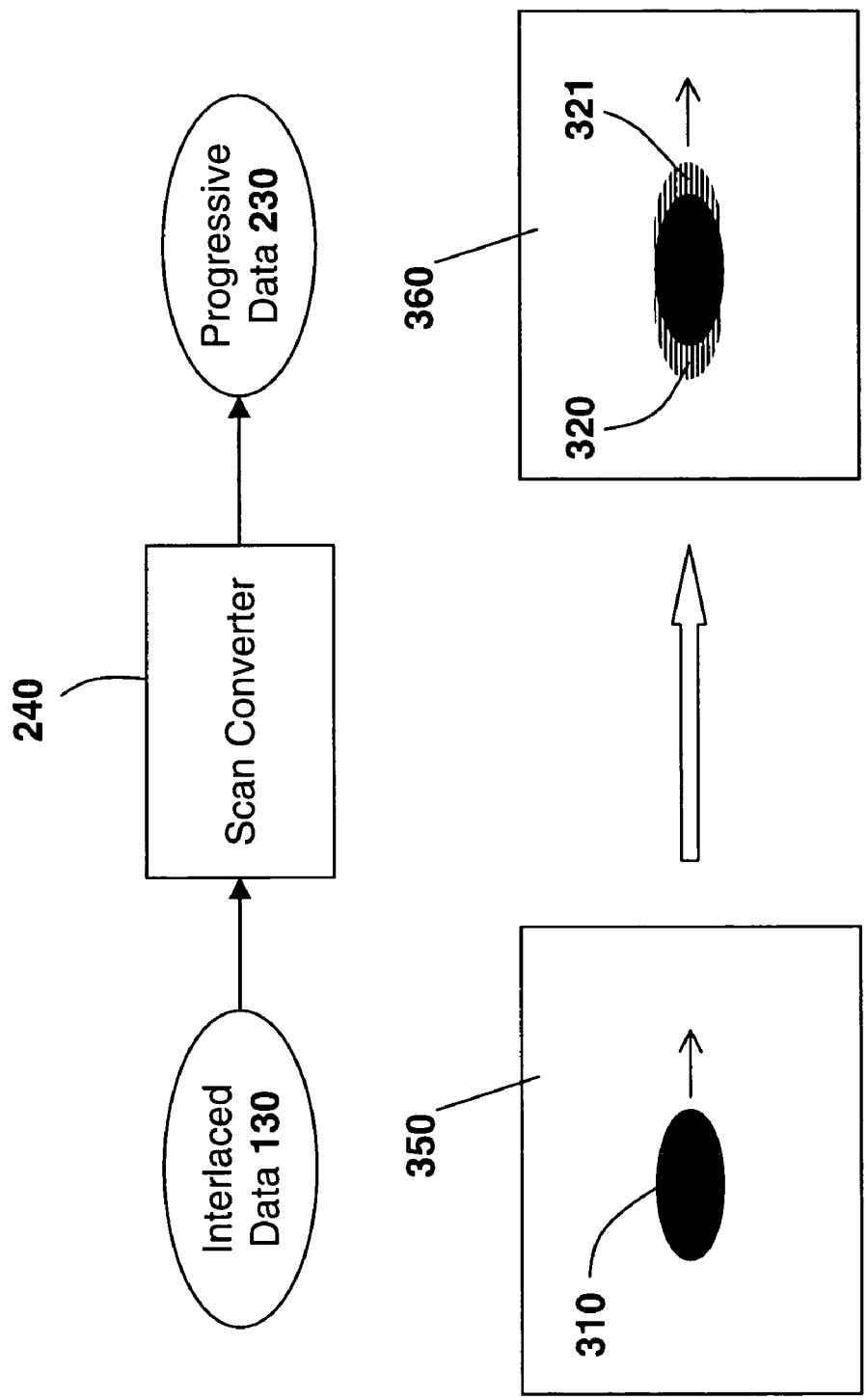
FIG. 3 illustrates the effects of image banding when an interlaced image is converted to a progressive image.
Figure 4:
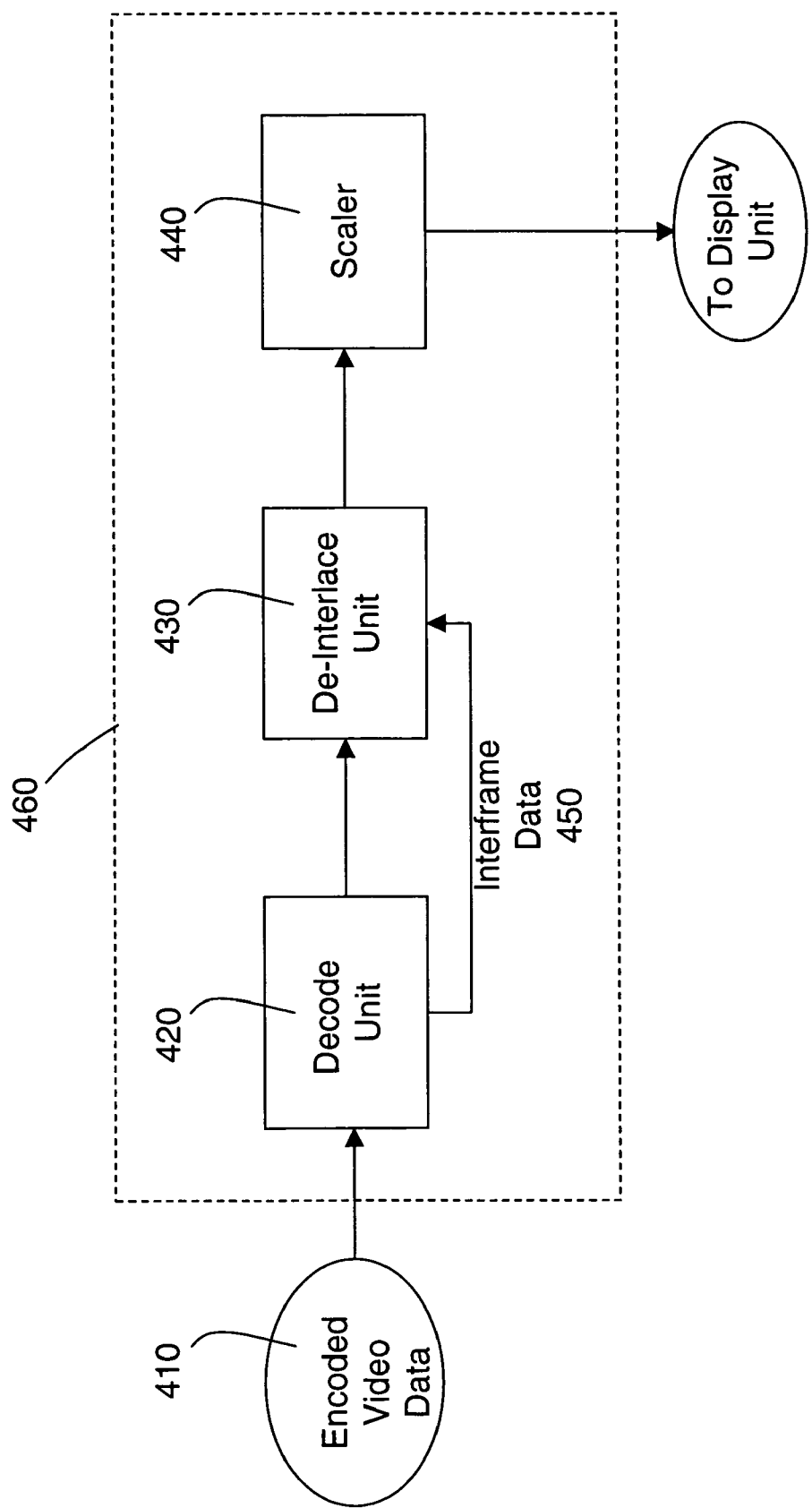
FIG. 4 illustrates one embodiment of a system in which interframe motion compensation data is used by a de-interlace unit in one embodiment of the invention.

One embodiment of a system for performing interlaced-to-progressive image conversion using interframe motion compensation data is illustrated in FIG. 4. In this embodiment, a decoder unit 420, a de-interlace unit 430, and a scaler unit 440 all reside on the same processor chip 460. It should be noted, however, that various multi-chip configurations may be implemented without departing from the underlying principles of the invention.

The decoder 420 in this embodiment decodes a stream of interlaced video data and transmits the decoded video data to the de-interlace unit 430. In one specific embodiment, the decoder 420 is an MPEG-2 decoder and the encoded video data is MPEG-2 data. However, it should be noted that the present system and method may be implemented using any video compression technique which includes interframe motion compensation data as part of its encoding algorithm.

The de-interlace unit 430 of one embodiment uses the decoded interframe motion compensation data to determine which image regions are moving and which are not. Those images that are moving faster than a predetermined threshold rate are selected by the de-interlace unit for a different type of interlaced-to-progressive image correction. For example, in one embodiment of the system and method, if the spatial difference between successive frames of a particular image region (e.g., the football 310) is significant enough, then the de-interlacer will reconstruct the region using only one group of interlaced row data (e.g., either the even row data or the odd row data, but not both). When only one group of interlaced data is used in this manner, the de-interlacer may interpolate to fill in the missing data rows.

By using pre-encoded motion compensation data in this manner, the present invention solves the problem of banding associated with interlaced-to-progressive conversion without the need for complex extrapolation techniques and/or high-powered microprocessors, and/or expensive high-speed memory systems to store the multiple frames to be analyzed. Essentially, rather than doing the motion analysis in the de-interlace unit 430, as is done in prior art de-interlacers, the de-interlace unit 430 utilizes the motion analysis that was done when the video signal was compressed.

The de-interlace unit 430 transmits the converted progressive image data to a scaler unit 440, which either increases or decreases the size of the image. For example, in one embodiment of the system and method, the encoded video data 410 read by the decoder unit 420 is at a standard television resolution of 480i (i.e., an interlaced format with 480 lines), a 480p signal (i.e. a progressive format with 480 lines) is produced by the de-interlace unit 430, and the image output by the scaler unit 440 is at a High Definition Television ("HDTV") standard such as 720p (i.e., a progressive format with 720 lines).

In another embodiment of the system and method, the encoded video data 410 read by the decoder unit 420 is at a High Definition television resolution of 1080i (i.e., an interlaced format with 1080 lines), a 1080p signal (i.e. a progressive format with 1080 lines) is produced by the de-interlace unit 430, and the image output by the scaler unit 440 is at a standard definition standard such as 480p (i.e., a progressive format with 480p lines).

Figure 8:
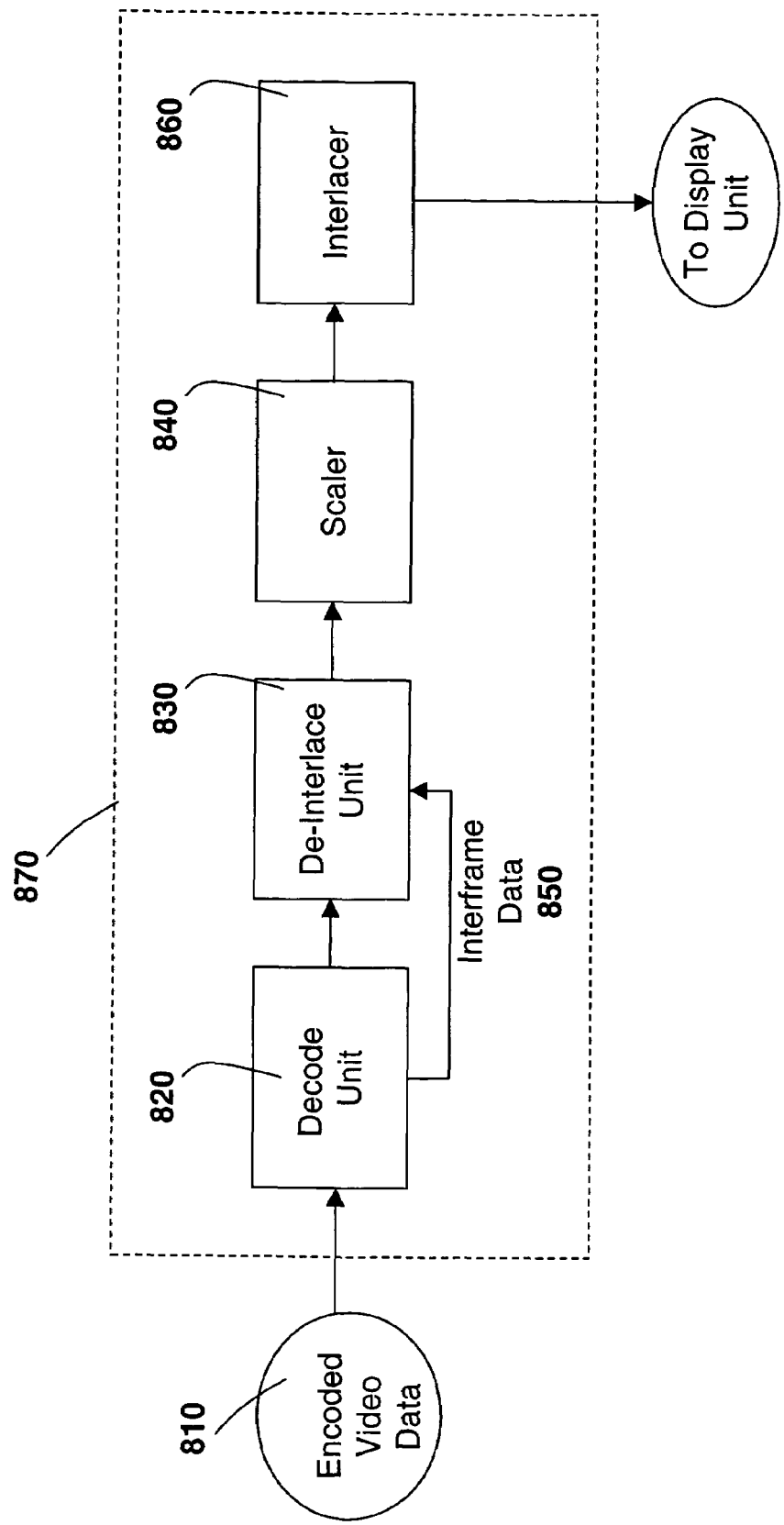
FIG. 8 illustrates one embodiment of a system in which an interlacer is used to produce an interlaced video output signal.

In another embodiment of the system and method, shown in FIG. 8, an interlacer unit 860 is added as an output option, making it possible to output an interlaced format signal, as required by a particular application or display device. The interlace unit 860 converts the progressive signal output by scaler unit 840 to an interlaced signal. Unlike interlaced-to-progressive conversion, which can result in image artifacts without special processing, progressive-to-interlace conversion is quite straightforward, and is well-known in the art. Since all lines, odd and even, are available in each progressive frame output by scaler unit 840, it is simply a matter of outputting the odd lines during the odd field of the output interlaced signal, and the even lines during the even field.

In this embodiment of the system and method, it is possible to convert one interlaced format to another without the motion artifacts normally associated with interlace-to-interlace conversion. For example, a decoded 480i standard definition TV signal is input to de-interlace unit 830, which produces a 480p signal. The scaler unit 840 scales the 480p signal and produces a 1080p signal. Then, the interlacer unit 860 interlaces the 1080p signal and produces a 1080i signal, and a 1080i signal is then output to the output display device. Since the units 810 through 850 operate precisely the same as units 410 through 450 from FIG. 4, as previously described herein, the 480i input signal is converted to a 1080p signal without motion artifacts, and since interlacer 860 converts progressive to interlace (using prior art techniques), the resulting 480i to 1080i conversion is accomplished without motion artifacts.

In yet another embodiment of the system and method, a 1080i signal is converted to 480i. For example, a decoded 1080i standard definition TV signal is input to de-interlace unit 830, which produces a 1080p signal. The scaler unit 840 scales the 1080p signal and produces a 480p signal. Then, the interlacer unit 860 interlaces the 480p signal and produces a 480i signal, and a 480i signal is then output to the output display device. Since the units 810 through 850 operate precisely the same as units 410 through 450 from FIG. 4, as previously described herein, the 1080i input signal is converted to a 1080p signal without motion artifacts, and since interlacer 860 converts progressive to interlace (using prior art techniques), the resulting 480i to 1080i conversion is accomplished without motion artifacts.

Figure 6:
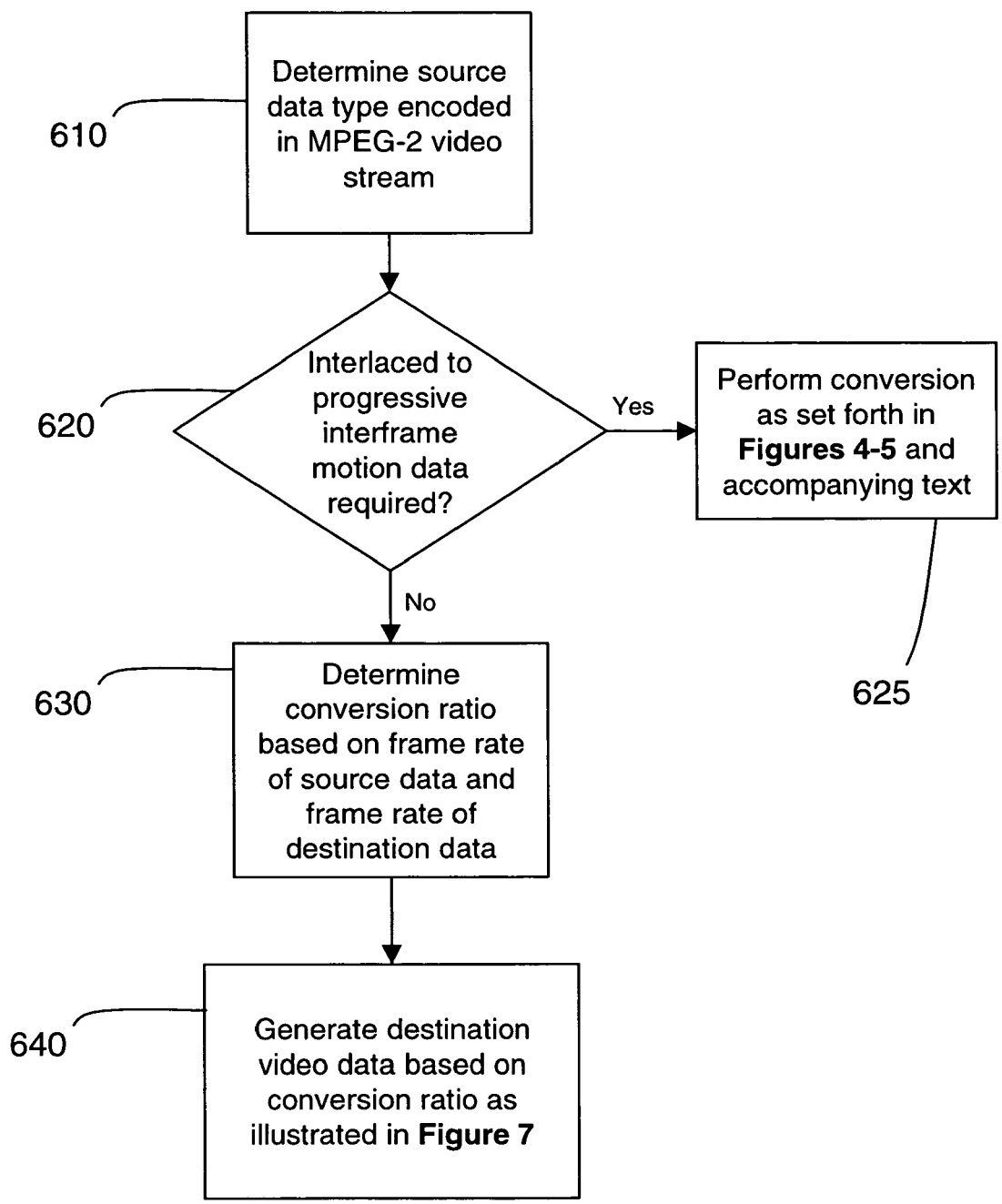
FIG. 6 illustrates a method implemented in accordance with one embodiment of the invention.

In one embodiment of the system and method, the MPEG-2 video stream is initially analyzed to determine if the type of source data is encoded in the stream. This is illustrated at step 610 in the flowchart of FIG. 6. Many digital transmission schemes such as satellite, digital cable, digital broadcast, digital video disk and digital video tape provide this type of identification information as part of the transmitted MPEG-2 stream.

Once the encoded source data has been identified, a particular type of conversion is selected. Different conversion techniques will be applied depending on the underlying encoded signal. For example, if it is determined that the underlying signal is a standard television or video signal (at 620) then the type of interlaced-to-progressive conversion described above may be performed (i.e., using interframe motion data). If, however, the source data is a standard 16 mm movie signal, then a different type of conversion may be applied.

Figure 7:
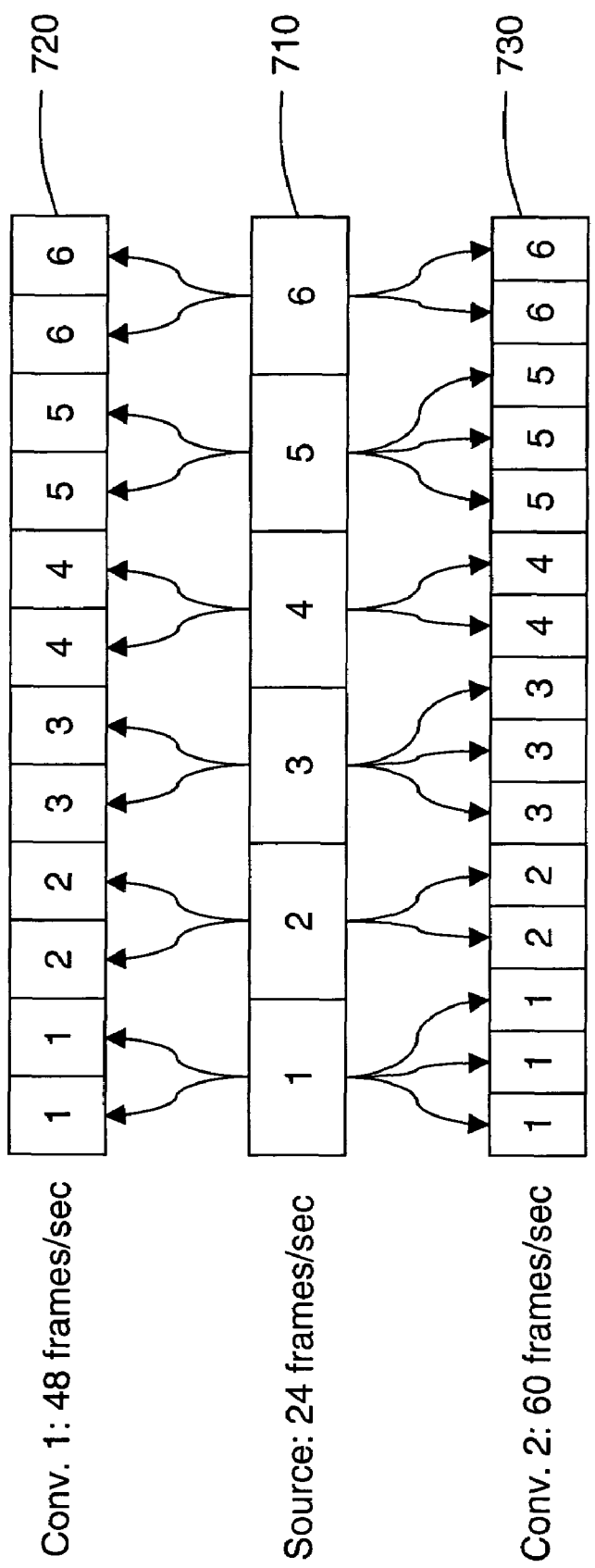
FIG. 7 illustrates a frame rate conversion system and method implemented in accordance with one embodiment of the invention.

One particular type of conversion is illustrated in FIG. 7. For the purpose of illustration the frame rate for the source data selected in FIG. 7 is the frame rate for a standard 16 mm movie: 24 frames/second. The first step in the conversion process is to determine the conversion ratio that will be applied (at step 630). The conversion ratio is based on the frame rate of the source signal and the destination signal. For example, as illustrated, if the converted signal 720 requires a frame rate of 48 frames/second, then there is a 48:24 or a 2:1 conversion ratio. As such, every frame in the 24 frame/second signal will be converted to two frames in the 48 frame/second signal 720.

Similarly, if the converted signal requires a frame rate of 60 frames/second, then a 24:60 or 2:5 conversion ration will be applied. This means that every two frames of the source signal will be used to generate five frames of the destination signal. Thus, frame 1 from signal 710 will be converted to three frames of signal 730; frame 2 of signal 710 will be converted to two frames of signal 730, . . . and so on.

Accordingly, by determining the type of source signal encoded in the MPEG-2 stream before converting, the processor and memory requirements for performing the conversion are significantly reduced. If the signal is one which requires interpolation, then the interframe motion data encoded in the underlying MPEG-2 stream will be used to perform the conversion (as set forth in detail above). If, however, the conversion does not require this type of processing, then alternative conversion techniques may be applied (e.g., frame rate conversion techniques such as those set forth in FIGS. 6 and 7).

Throughout the foregoing description, for the purposes of explanation, numerous specific details were set forth in order to provide a thorough understanding of the present system and method. It will be apparent, however, to one skilled in the art that the system and method may be practiced without some of these specific details. Accordingly, the scope and spirit of the invention should be judged in terms of the claims which follow.

What is claimed is:

1. An apparatus comprising:
   a decode unit which receives a first encoded interlaced video signal including encoded interframe motion compensation data, and responsively transmits a decoded interlaced video signal and associated interframe motion compensation data; and
   a de-interlace unit which converts said first interlaced video signal to a first progressive video signal by using the interframe motion compensation data to detect an image region moving faster than a threshold rate, and reconstructing said region using only the odd or the even rows of said interlaced signal.

2. The apparatus as claimed in claim 1 wherein said encoded first interlaced video signal is an MPEG-2 signal.

3. The apparatus as claimed in claim 2 further including a scaling unit which converts said first progressive video signal to a second progressive video signal at a different resolution.

4. The apparatus as claimed in claim 3 wherein said first interlaced signal is a standard television signal and said second progressive video signal is an HDTV signal.

5. The apparatus as claimed in claim 4 wherein said standard television signal is a 480i signal and said HDTV signal is a 720p signal.

6. The apparatus as claimed in claim 4 wherein said standard television signal is a PAL standard video signal and said HDTV signal is a 720p signal.

7. The apparatus as claimed in claim 3 wherein said first interlaced signal is an HDTV signal and said second progressive video signal is an HDTV signal.

8. The apparatus as claimed in claim 7 wherein said interlaced HDTV signal is a 1080i and said progressive HDTV signal is a 720p signal.

9. The apparatus as claimed in claim 3 further including an interlacer unit which converts said second progressive video to a second interlaced video signal.

10. The apparatus as claimed in claim 9 wherein said first interlaced signal is a standard television signal and said second interlaced video signal is an HDTV signal.

11. The apparatus as claimed in claim 10 wherein said standard television signal is a 480i signal and said HDTV signal is a 1080i signal.

12. The apparatus as claimed in claim 10 wherein said standard television signal is a PAL standard video signal and said HDTV signal is a 1080i signal.

13. The apparatus as claimed in claim 9 wherein said first interlaced signal is an HDTV television signal and said second interlaced video signal is a standard TV signal.

14. The apparatus as claimed in claim 13 wherein said standard television signal is a 480i signal and said HDTV signal is a 1080i signal.

15. The apparatus as claimed in claim 13 wherein said television signal is a PAL standard signal and said HDTV signal is a 1080i signal.

16. The apparatus as claimed in claim 9 wherein said de-interlace unit interpolates between said even or odd interlaced rows to fill, respectively, the missing odd or even interlaced rows.

17. The apparatus as claimed in claim 1 wherein said encoded first interlaced video signal is an MPEG-1 signal.

18. The apparatus of claim 1 wherein said de-interlace unit interpolates between said even or odd interlaced rows to fill, respectively, the missing odd or even interlaced rows.

19. A method comprising the steps of:
    receiving an encoded interlaced video signal including encoded interframe motion compensation data, said encoded interlaced video signal comprised of data for generating an interlaced video image, and said encoded interframe motion compensation data identifying motion of a region of said interlaced video image;
    separating said interframe motion compensation data from said interlaced video signal;
    de-interlacing said region of said interlaced video image by selecting only the even or the odd rows of an interlaced video image region in response to said interlaced region having changed in position between successive video frames by at least a particular distance; and
    de-interlacing the remaining portions of said interlaced video image using a both odd and even rows of said interlaced video signal.

20. The method as claimed in claim 19 wherein said encoded interlaced video signal is an MPEG-2 signal.

21. The method as claimed in claim 19 wherein said encoded interlaced video signal is an MPEG-1 signal.

22. The method as claimed in claim 19 including the step of interpolating between said selected even or odd interlaced rows to fill, respectively, the missing odd or even interlaced rows.

23. The method as claimed in claim 19 further including the step of scaling said de-interlaced region of said interlaced image and said remaining de-interlaced portions of said interlaced image to a first progressive video signal at a different resolution.

24. The method as claimed in claim 23 wherein said interlaced signal is a standard television signal and said first progressive video signal is an HDTV signal.

25. The method as claimed in claim 24 wherein said standard television signal is a 490i signal and said HDTV signal is a 720p signal.

26. The method as claimed in claim 24 wherein said standard television signal is a PAL standard video signal and said HDTV signal is a 720p signal.

27. The method as claimed in claim 23 wherein said interlaced signal is an HDTV television signal and said first progressive video signal is a standard definition signal.

28. The method as claimed in claim 27 wherein said standard television signal is a 480i signal and said HDTV signal is a 720p signal.

29. The method as claimed in claim 27 wherein said standard television signal is a PAL standard video signal and said HDTV signal is a 720p signal.

30. The method as claimed in claim 23 further including the step of interlacing said first progressive video signal into a second interlaced video signal.

31. The method as claimed in claim 30 wherein said interlaced signal is a standard television signal and said second interlaced video signal is an HDTV signal.

32. The method as claimed in claim 31 wherein said standard television signal is a 480i signal and said HDTV signal is a 1080i signal.

33. The method as claimed in claim 31 wherein said standard television signal is a PAL standard video signal and said HDTV signal is a 1080i signal.

34. The apparatus method as claimed in claim 30 wherein said interlaced signal is an HDTV television signal and said second interlaced video signal is a standard definition signal.

35. The method as claimed in claim 34 wherein said standard definition signal is a 480i signal and said HDTV signal is a 1080i signal.

36. The method as claimed in claim 34 wherein said standard definition signal is a PAL standard video signal and said HDTV signal is a 1080i signal.

37. A method for converting an encoded video signal comprising the steps of:
determining a source video data type encoded in said encoded video signal;
determining whether said source video data type is one for which interframe motion compensation data should be for conversion;
selecting a particular frame rate conversion ratio if said source video data type is capable of conversion without use of said interframe motion compensation data; and
using said frame rate conversion ratio to convert each frame of said source video data type to one or more frames of destination video data type.

38. The method for converting an encoded video signal as claimed in claim 37 wherein said encoded video signal is an MPEG-2 signal.

39. The method for converting an encoded video signal as claimed in claim 37 wherein said encoded video signal is an MPEG-1 signal.

40. The method for converting an encoded video signal as claimed in claim 37 including the additional step of using said interframe motion data for conversion if said source video data type is one for which interframe motion data should be used.

41. The method for converting an encoded video signal as claimed in claim 40 wherein said interframe motion compensation data is used to identify regions of said source video data type which are in motion.

42. The method for converting an encoded video signal as claimed in claim 41 including the additional step of converting said identified regions by selecting only the even or the odd rows of said identified regions and interpolating between said selected even or odd interlaced rows to fill, respectively, the missing odd or even interlaced rows.

43. The method for converting an encoded video signal as claimed in claim 42 wherein said source video data type is an interlaced video data type and said destination video data type is a progressive video data type.

44. The method for converting an encoded video signal as claimed in claim 43 wherein said interlaced video data type is a 480i standard definition television signal.

45. The method for converting an encoded video signal as claimed in claim 43 wherein said interlaced video data type is a PAL format standard definition television signal.

46. The method for converting an encoded video signal as claimed in claim 43 wherein said interlaced video data type is a 1080i format HDTV signal.

47. The method for converting an encoded video signal as claimed in claim 37 wherein said source video data type is a 24 frame/second movie encoded as a 480i standard definition video signal.

48. The method for converting an encoded video signal as claimed in claim 47 wherein said destination video signal is a 60 frame/second signal.

49. An apparatus comprising:
a decode unit which receives an encoded interlaced video signal including encoded interframe motion compensation data, and responsively transmits a decoded interlaced video signal and associated interframe motion compensation data; and
a de-interlacer, which converts said interlaced video signal to a progressive scan video signal, responsive to detecting in said interframe motion compensation data an interlaced region that has changed in position between successive video frames by at least a particular distance, reconstructs said interlaced region using only the odd or the even rows of said interlaced video signal.

50. The apparatus of claim 49 wherein said de-interlacer interpolates between said even or odd interlaced rows to fill, respectively, the missing odd or even interlaced rows.

51. The apparatus of claim 49 wherein said de-interlacer de-interlaces the interlaced video signal outside said interlaced region using both odd and even rows of said interlaced video signal.

\* \* \* \* \*

UNITED STATES PATENT AND TRADEMARK OFFICE
CERTIFICATE OF CORRECTION

PATENT NO. : 7,573,529 B1  Page 1 of 1
APPLICATION NO. : 09/379710
DATED : August 11, 2009
INVENTOR(S) : Stephen G. Perlman It is certified that error appears in the above-identified patent and that said Letters Patent is hereby corrected as shown below:

Column 1, Line 59 reads, "This problem is particularly noticeable when low resolution..." which should read, "This problem is particularly noticeable when a low resolution..."

Column 3, Line 60 reads, "Embodiments of the present invention includes..." which should read, "Embodiments of the present invention include..."

Column 4, Line 10 reads, "...optical cards, or other type of media..." which should read, "...optical cards, or other types of media..."

Column 6, Line 49 reads, "...2:5 conversion ration will be applied." which should read, "...2:5 conversion ratio will be applied."

Column 7, Line 39 reads, "...HDTV signal is a 1080i and said..." which should read, "...HDTV signal is a 1080i signal and said..."

Column 8, Line 20 reads, "...using a both odd and even rows..." which should read, "...using both odd and even rows..."

Column 8, Line 65 reads, "The apparatus method as claimed in claim 30..." which should read, "The method as claimed in claim 30..."

Column 10, Line 32 reads, "...frames by at least a particular distance, reconstructs said interlaced region..." which should read, "...framed by at least a particular distance, and reconstructs said interlaced region..."

Signed and Sealed this

Nineteenth Day of January, 2010

David J. Kappos
*Director of the United States Patent and Trademark Office*